United States Patent [19]

Mary

[11] Patent Number: 4,695,892
[45] Date of Patent: Sep. 22, 1987

[54] METHOD FOR DETERMINING THE ANGULAR DIMENSIONS OF A SCENE RECORDED BY A VIDEO SYSTEM

[75] Inventor: Donald J. Mary, New Carrollton, Md.

[73] Assignee: The United States of America as represented by the Secretary of the Army, Washington, D.C.

[21] Appl. No.: 880,512

[22] Filed: Jun. 27, 1986

[51] Int. Cl.⁴ ...................... H04N 5/272; H04N 5/225
[52] U.S. Cl. .................................... 358/225; 358/107; 358/139; 358/183
[58] Field of Search ................ 358/139, 225, 183, 107

[56] References Cited

U.S. PATENT DOCUMENTS 3,612,760 10/1971 McKechnie .......................... 358/139
4,326,219 4/1980 Griesshaber ........................ 358/139
4,396,944 8/1983 McKennie ........................... 358/183

Primary Examiner—Gene Z. Rubinson
Assistant Examiner—Stephen Brinich
Attorney, Agent, or Firm—Saul Elbaum; Thomas E. McDonald; Alan J. Kennedy

[57] ABSTRACT

A method of calibrating a video system, which includes a video camera having a lens for viewing a scene and a video recorder for recording the scene on video tape, to determine both vertical and horizontal angular dimensions of the scene. The video camera lens is focused for infinity and an image of an illuminated reticle pattern of known angular shape and size formed at infinity is projected into the video camera lens and recorded on the video tape by the video recorder. The optical device used to project the reticle pattern image is similar to known projection systems of certain types of gunsights.

7 Claims, 5 Drawing Figures

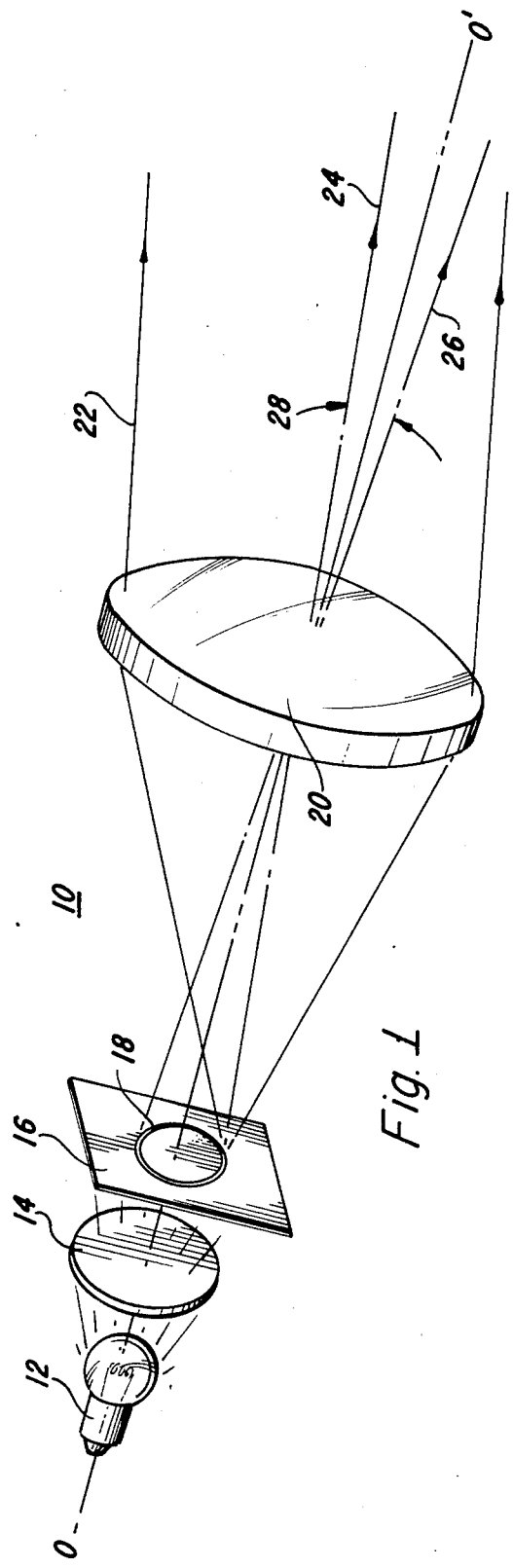
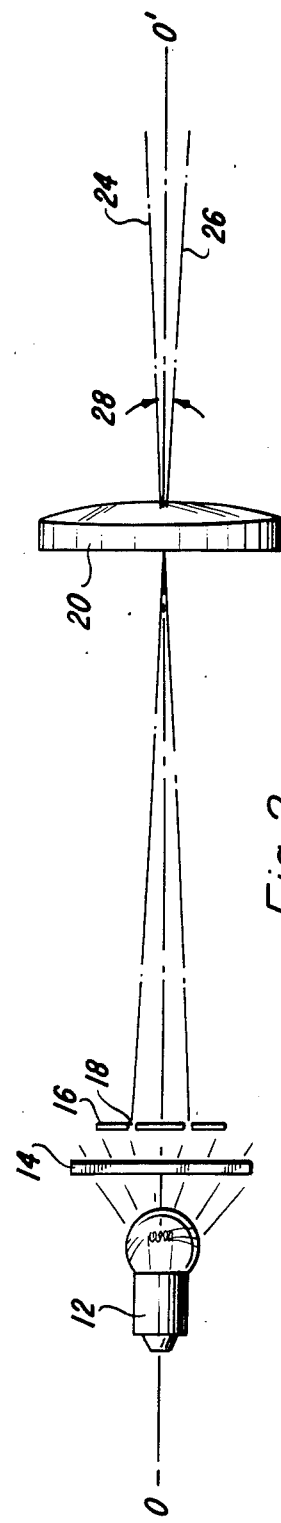
Fig. 1
Fig. 2

METHOD FOR DETERMINING THE ANGULAR DIMENSIONS OF A SCENE RECORDED BY A VIDEO SYSTEM

RIGHTS OF THE GOVERNMENT

The invention described herein may be manufactured, used, and licensed by or for the U.S. Government for Governmental purposes without payment to me of any royalty thereon.

BACKGROUND OF THE INVENTION

The invention relates generally to video recording systems and, more particularly, to a method for determining the angular dimensions of a scene recorded by a video system.

During field tests of explosive devices and the like, remotely-disposed video systems often replace movie cameras used to record data during these field tests since the results, recorded on video tape, can be replayed on the spot for inspection. When dimensional information is to be extracted from the video data, the scene is displayed on the video monitor requires some form of calibration to eliminate the effects of system parameters. The angular dimensions of the field of view (or the dimensions of some part of it) are usually required in both the vertical and horizontal directions. When viewing a distant scene, the video system is sometimes calibrated by placing in the scene objects such as vertical poles, spaced a known distance apart at a known distance from the video camera. The angular separation and the angular height of the poles can be computed from the geometry of their deployment and the subsequent calibration of the scene on the video monitor can be accomplished.

The calibration of the video system by the use of poles and other known objects is subject to error. The calibration can only be as accurate as the measurement of the pole geometry. Often the optimal location for the poles may be in a hazardous or inaccessable area. At best, the deployment of the calibrating poles is a time consuming operation.

SUMMARY OF THE INVENTION

Therefore, it is a primary object of the invention to provide a quick, accurate, inexpensive method for the angular calibration of data recorded on a video tape.

This calibration method, according to the invention, may be performed by an operator with a small, self-contained optical device similar to known gun sights. When held in front of a video camera lens focused for infinity, this optical device projects into the lens the image of an illuminated reticle pattern of known angular shape and size. The response of the video system to this pattern is recorded on a video tape, thereby calibrating subsequent test data recorded on the tape. Calibration takes only a few moments, may be repeated at will, and eliminates operator error.

In one embodiment of the invention, this optical device contains a circular ring pattern etched through an opaque material. The ring pattern is placed in the focal plane of a lens and illuminated from behind by a diffuse light source. The result is that the lens forms an image of the ring pattern at infinity. When the optical device is held in front of a video camera lens focused at infinity in such a manner as to allow the light from the device to enter the camera lens, an image of the ring pattern is seen on the video monitor and can be recorded on video tape. Since the angular diameter of the ring pattern is known, the video system is considered calibrated as soon as the ratio of the linear diameter of the ring pattern on the video monitor and the angular diameter of the ring pattern is calculated.

BRIEF DESCRIPTION OF THE DRAWINGS

The invention will be better understood, and further objects, features, and advantages thereof will become more apparent from the following description of preferred embodiments, taken in conjunction with the accompanying drawings in which:

FIG. 1 is a perspective view of an optical device which may be used in the invention;

FIG. 2 is a schematic side view of the optical device of FIG. 1;

DESCRIPTION OF PREFERRED EMBODIMENTS

Figure 3:
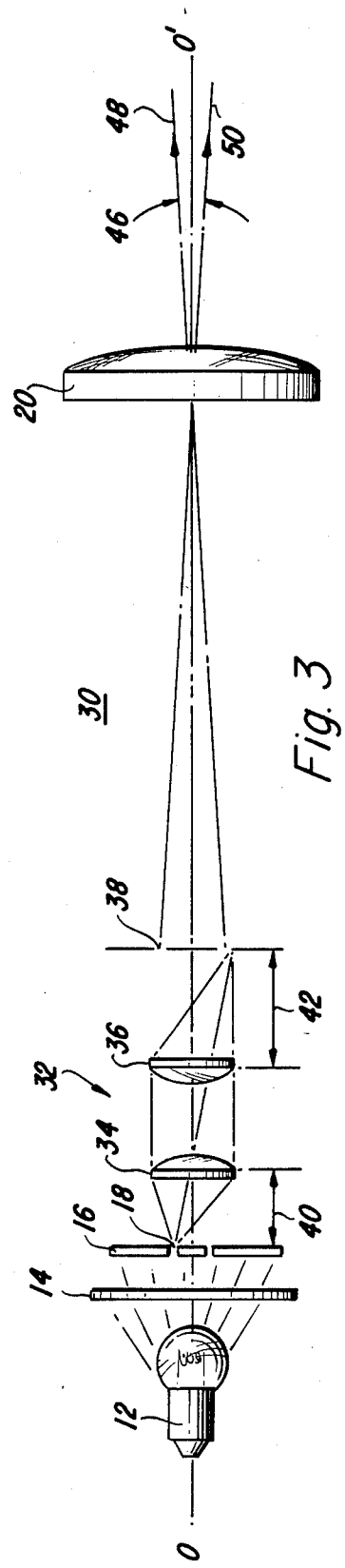
FIG. 3 is a schematic side view of a preferred optical device for use in the invention, in which the angular size of the output image is adjustable over a limited range.

FIG. 1 shows the basic elements of a simple optical device 10 to be used in the invention, without the housing or support structure necessary to maintain these elements in proper position and alignment along the optical axis O-O'. The device includes a lamp 12, a diffusing element 14 such as a piece of frosted or ground glass, a flat sheet 16 of opaque material through which a ring pattern 18 is etched, and a lens 20. The ring pattern 18 is disposed in the focal plane of the lens 20, and is positioned to be centered on and perpendicular to the optical axis O-O' of the lens 20. The diffusing element 14 is positioned between the ring pattern 18 and the lamp 12 to provide uniform illumination to the ring pattern 18. Light rays passing through the ring pattern 18 are thus focused into a collimated beam 22 by the lens 20, and an image of the ring pattern 18 is formed at infinity. Two such light rays 24, 26, emanating from opposite ends of the diameter of the ring pattern 18, are shown in FIG. 1. As these rays 24, 26 leave the lens 20, they diverge at an angle 28. Angle 28 is, then, the angular diameter of the ring pattern 18.

FIG. 2 shows this relationship more clearly. Angle 28 is dependent on the actual diameter of the ring pattern 18 and the focal length of the lens 20. Minor variations of these parameters from optimum values will generate an angular diameter (angle 28) for the ring pattern image which may be other than an integral value. An addition to the optical device, such as shown in FIG. 3, will permit adjustments to be made in the value of the angle 28.

The optical device 30 shown in FIG. 3 includes a varifocal erecting system 32 which includes two positive lenses 34, 36 which are disposed along the optical axis O-O' between the ring pattern 18 and the lens 20 so as to form an image 38 of the ring pattern 18 in the focal plane of the lens 20. Depending on the focal lengths of the lenses 34, 36, the object distance 40 and the image distance 42, the diameter of the ring pattern image 38 in the focal plane of the lens 20 can be made smaller or larger than the original ring pattern 18. The ring pattern image 38 now becomes the object for the lens 20 and the angular diameter of the final image is the angle 46, as defined by the light rays 48 and 50 emanating from opposite sides of the ring pattern image 38. Thus, the angular diameter of the final ring pattern 44 can be adjusted to a desired value over a limited range by the parameters associated with the erector lenses 34 and 36.

Varifocal erecting systems, or "zoom" systems are well known and are described in many Optic textbooks, such as for example, "Modern Optics", by Earle B. Brown, copyright 1965 by Reinhold Publishing Co., section 6.10.

Figure 4:
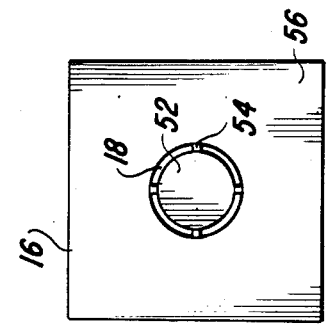

FIG. 4 shows the sheet 16 of opaque material, through which the ring pattern 18 has been etched. Here, the center disk 52 of the ring pattern 18 is supported by four equally spaced bridges 54 to the outer section 56. Clearly, this pattern 18 can be made in the form of an image on a photographic negative, a pattern etched through a thin metal plate, a pattern etched through the reflective coating of a mirror, or by any of various methods of fabrication. Such a pattern when used in the optical devices 10, 30 described above will generate a lighted image of this shape on the otherwise darkened screen of the video monitor, when the optical device 10, 30 is held in front of the video camera and the collimated light beam output of this optical device is directed into the video camera lens.

Figure 5:
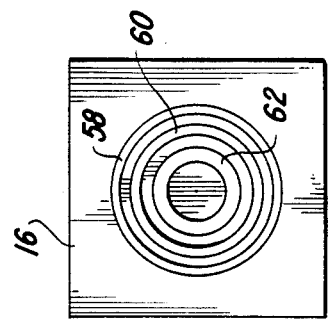
FIGS. 4 and 5 show respective reticle patterns which may be used in the optical device of FIGS. 1-3.

The linear diameter of this image will be directly dependent on the focal length of the video camera lens. Thus, a specific diameter of the ring pattern may not be suitable for all video camera lenses. FIG. 5 shows an alternative pattern consisting of concentric circles 58, 60 and 62. These circles, or rings, can be made in the same manner as that decribed in FIG. 4, but because of their multiplicity can accomodate a variety of camera lens focal lengths.

In another variation of the invention, interchangeable opaque sheets 16, each containing a different ring pattern 18, could be utilized with the optical device 10, 30. In such an embodiment, each particular ring pattern 18 would correspond with a particular video camera lens.

In the calibration method, according to the invention, the video camera lens is focused at infinity, and the optical device 10 or 30 is held in front of the video camera lens so that the image of the ring pattern 18 or 44 appears on the video monitor while the output of the video camera is being recorded on video tape. Since the optical device 10, 30 produces a collimated light output beam, the distance at which the optical device is disposed from the video camera lens is not important, so long as a sufficient portion of this collimated light beam is received by the video camera lens so as to produce an image of the ring pattern on the video monitor.

There are many additions, variations, and modifications to the invention which would be obvious to one skilled in the art. For example, the optical device 10 or 30 could be pivotally connected to the video camera so that it could be rotated in front of the video camera lens. In such a variation of the invention, the reticle pattern could be a square or rectangular pattern, rather than a ring pattern. Also, ambient light could be used instead of the lamp 12 to generate the ring pattern 18 by using some means, such as a hood, to exclude light from the video camera lens other than that passing through the optical device. Further, the ring pattern could be formed as a dark line against a light background, rather than vise versa.

In view of the many obvious variations, combinations, and modifications to the invention, it is intended that the scope of the invention be limited only by the appended claims.

What is claimed and desired to be secured by Letters Patent of the United States is:

1. A method of calibrating a video system, including a video camera having a lens for viewing a scene and a video recorder for recording the scene on video tape, to determine angular dimensions of the scene, comprising the steps of:
   focusing the video camera lens for infinity;
   projecting into the video camera lens an image of an illuminated reticle pattern of known angular shape and size formed at infinity; and
   recording the image projected into the video camera lens on the video tape.

2. A method of calibrating a video system, as described in claim 1, wherein the step of projecting the illuminated reticle pattern image into the video camera lens comprises the step of projecting a collimated light output beam of an optical device into the video camera lens, said optical device comprising:
   an output lens having an optical axis and a focal plane;
   a light source for directing light along the optical axis toward the output lens; and
   image forming means, disposed along the optical axis intermediate the light source and the output lens, for forming the illuminated reticle pattern image in the focal plane of the output lens.

3. A method of calibrating a video system, as described in claim 2, wherein the light source is a diffused light source and the image forming means comprises a flat sheet member, disposed on the optical axis in the focal plane of the output lens, having opaque portions which block passage of light therethrough and clear portions which permit passage of light therethrough to form the illuminated reticle pattern image.

4. A method of calibrating a video system, as described in claim 2, wherein the image forming means comprises a flat sheet member, disposed on the optical axis in the focal plane of the output lens, having opaque portions which block passage of light therethrough and translucent portions which diffuse and permit passage of light therethrough to form the illuminated reticle pattern image.

5. A method of calibrating a video system, as described in claim 2, wherein the image forming means comprises:
   a diffused light source a flat sheet member, disposed on the optical axis in a plane orthogonal to the optical axis intermediate the light source and the focal plane of the output lens, having opaque portions which block passage of light therethrough and having clear portions which permit passage of light therethrough; and
   a varifocal erecting system comprising two lenses disposed on the optical axis intermediate the sheet member and the focal plane of the output lens, for forming the illuminated reticle pattern image in the focal plane of the output lens, the position of the erecting system lenses being adjustable along the optical axis to adjust the size of the illuminated reticle pattern image.

6. A method of calibrating a video system, as described in claim 2, wherein the image forming means comprises:
   a flat sheet member, disposed on the optical axis in a plane orthogonal to the optical axis intermediate the light source and the focal plane of the output lens, having opaque portions which block passage of light therethrough and having translucent portions which diffuse and permit passage of light therethrough; and a varifocal erecting system comprising two lenses disposed on the optical axis intermediate the sheet member and the focal plane of the output lens, for forming the illuminated reticle pattern image in the focal plane of the output lens, the position of the erecting system lenses being adjustable along the optical axis to adjust the size of the illuminated reticle pattern image.

7. A method of calibrating a video system, as described in claim 1, wherein the reticle pattern comprises a circular figure.

* * * * *